O. LINDER & J. B. REPLOGLE.
SELENIUM CELL.
APPLICATION FILED JAN. 26, 1911.
1,011,824.
Patented Dec. 12, 1911.
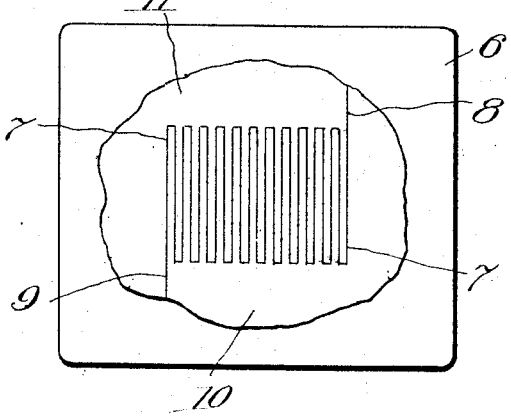
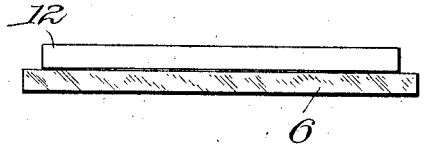
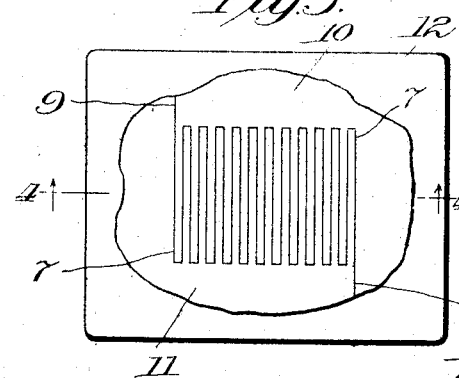
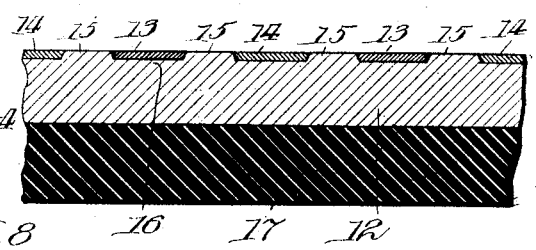
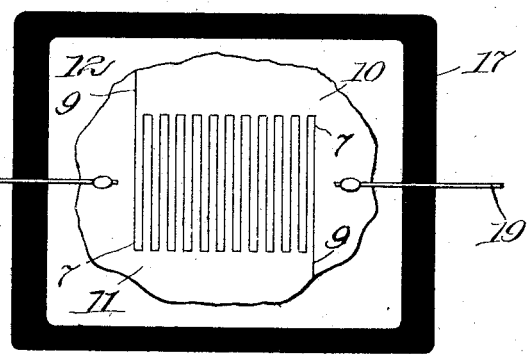
WITNESSES
INVENTORS
Oscar Linder
James B. Replogle

UNITED STATES PATENT OFFICE.

OSCAR LINDER AND JAMES B. REPLOGLE, OF CHICAGO, ILLINOIS.

SELENIUM CELL.

1,011,824.

Specification of Letters Patent.   Patented Dec. 12, 1911.

Application filed January 26, 1911.  Serial No. 604,833.

*To all whom it may concern:*

Be it known that we, OSCAR LINDER, a citizen of the Republic of Switzerland, and JAMES B. REPLOGLE, a citizen of the United States, both residing at Chicago, in the county of Cook and State of Illinois, have invented certain new and useful Improvements in Selenium Cells, of which the following is a specification.

This invention relates to a new and improved form of selenium cell, the primary object of the improvement being to very greatly increase the accuracy of the measurements of the cell and its effectiveness or conductivity for a given size or weight and cost.

In the first place, it will be understood that where in the specification and claims, we use the term "cell", we contemplate a resistance unit, which makes use of certain elements whose conductivity changes in accordance with the intensity of light to which they are subjected. The best known and most convenient element with which we are now familiar for this purpose is selenium, but we do not limit ourselves in any way to its use except as defined in the claims.

The selenium, or other material, which is used in a cell of this character, changes its resistance according to the intensity of the light to which it is subjected. However, selenium and other similar materials are largely opaque, and consequently, the film or layer of the material, the resistance of which is affected by the intensity of the light, is very thin, and, therefore, it is desirable to make use of this thin film or layer of selenium which is exposed to the light to the greatest extent possible. Furthermore, the effectiveness of such a resistance unit may be said to vary almost inversely as the distance between the electrical conductors, which carry the current to and from the selenium, or other material, and directly as the surface of contact between the electrical conductors and the resistance material. Consequently, it is desirable to be able to reduce the distance between the electrical conductors to the minimum possible amount and to increase the area of effective contact between the electrical conductors and the resistance material to the greatest possible amount.

Objects of this invention are, to provide a variable resistance unit, in which the resistance material shall be used with the greatest possible effectiveness, particularly that the exposed film or layer of the same which is affected by the light shall have the greatest possible conductivity of the resistance unit as a whole per unit of exposed surface; to provide a variable resistance unit which is properly designed and constructed to obtain the greatest possible uniformity and permanency of construction, so that it will be possible to closely predetermine the conductivity of the unit before it is made; to provide a variable resistance unit, which can be constructed with the greatest possible assurance that when completed, there will be no short circuits between the conductors of the electrical poles; to provide a variable resistance unit which can be cheaply constructed, and in other manners and ways to generally improve the form and construction of such a device.

Other objects and uses will appear from a detailed description of the invention, which consists in the features of construction and combination of parts hereinafter described and claimed.

Referring now to the drawing, in Figure 1, we show a plan view of the platinum, or other conducting surface, after the same has been deposited on a plate of glass and has been properly scratched or marked preparatory to applying the selenium, or other conducting material to the platinum; in Fig. 2, we show a cross section of the cell after the selenium, or other material, has been applied to the platinum film and before the glass plate has been removed; in Fig. 3, we show a plan view of the film of platinum after the selenium has been applied to the same and the glass plate withdrawn; in Fig. 4, we show a partial cross section through a completed cell on a tremendously exaggerated scale; and in Fig. 5, we show a plan view of the completed cell suitably mounted on a block of rubber, or other material, and having electrical wires or other conductors connected to the opposite poles of the platinum film.

As above stated, the layer or film of selenium, or other variable resistance material, whose conductivity is changed according to the intensity of the light, is very thin because of the opaque character of such material. We, therefore, construct our cell in the best way to use this thin layer or film to the best possible advantage. To this end, we take a very thin layer of metal and scratch the same so as to sever it into two parts which eventually become the opposite poles or electrodes of the completed cell. This is best done by depositing such metal, for example, on a plate of glass. Then the metal may be easily severed by an extremely narrow scratch by means of a suitable tool. The plastic selenium may then be pressed up against this film of metal while the same still adheres to the glass, when it will be found that the selenium, or other variable resistance material, has entered into the aforementioned scratch to fill the same and provide a layer of conducting selenium in the scratch between the opposite electrical poles of the metal layer. Thereafter, the selenium, or other material, may be treated chemically or otherwise as desired, in order to change its form into that best adapted for the requirements, and it will be found that the selenium, or other material, adheres to the layer of metal so that the latter will stick to it and may be withdrawn from the glass plate. Thereafter, an electrical wire may be connected to each of the portions of the metal film and the electric current will pass from one of said portions through the selenium in the scratch to the opposite of said portions.

Referring now to the figures, the numeral 6 designates the glass plate on which an extremely thin layer of platinum, or other suitable metal, is deposited. This is shown as having assumed an irregular outline. By means of a very fine pointed instrument, a zigzag scratch 7 is made back and forth in said layer of platinum, the ends 8 and 9 of said scratch being carried clear to the edge of the layer of metal, so as to completely sever it into two portions 10 and 11. It will be understood eventually that the selenium, or other conducting material, is pressed into this zigzag scratch so as to provide a conducting medium between the portions 10 and 11. Therefore, in order to use the material to the greatest advantage, the scratch is zigzagged back and forth so as to make it as long as possible for a given surface of platinum, and the zigzag lines may be scratched very close together.

While the layer of platinum, or other material, still lies on the glass plate, a cake of plastic selenium, or other suitable, variable resistance material, 12 is pressed down against the platinum with considerable force, as shown in Fig. 2, so as to insure that it will enter into the scratch. Thereafter, the selenium, or other material, may be chemically treated as desired in order to reduce it into the proper form, and then it will be found that the glass plate may be removed, leaving the platinum, or other metal, sticking to the selenium, the latter entering into the crack or scratch, as shown in Fig. 3.

The cross section taken on line 4—4, as shown in Fig. 4, will reveal the relation which the metal film or layer bears to the cake of selenium, or other material. In this case, it will be understood that the strips 13 of the metal are connected together, while the strips 14 are also connected together, but are insulated from the strips 13, except through the medium of the selenium, or other variable resistance material. The latter constitutes a block 12, whose upper portions 15 are pressed or forced up between the consecutive strips 13 and 14, so as to provide a conducting film between them.

As before stated, the section shown in Fig. 4, is on a tremendously exaggerated scale. In practice, it might occur that the thickness of the film of platinum, or other material, would not exceed a millionth of an inch, and consequently, the portions 15 of the selenium would be of substantially the same thickness. Now, it is evident that the light will penetrate into the selenium for some distance, and consequently, the conductivity of practically the entire thickness of the portions of selenium 15 will be affected by the light. In other words, practically the entire portion of selenium, lying between the adjacent conductors, will change its resistance in accordance with the intensity of light striking the surface of the cell.

Of course, it will also be understood that the width of the selenium between the adjacent strips 13 and 14 is extremely narrow. It is possible to secure this extreme narrowness by reason of the manner in which the scratches are made in the film or layer of platinum, or other metal. A sharp pointed instrument will have a certain amount of bevel on its sides. Consequently, in scratching a thin layer of platinum, such as is here used, that portion of the bevel of the instrument is active which is the narrowest portion. Although we have illustrated in Fig. 4 beveled edges on the sides of the strips 13 and 14 of the metal film, it will be understood that this is merely shown this way for it is probable that they will be beveled.

It will be understood that on account of the extreme thinness of the film of platinum, or other material, that a certain amount of light will shine through the same, and consequently, the film 16 of selenium, or other material, immediately underneath the metal, will be affected by this light. Although this selenium is not placed in the most advantageous position for affecting the conductivity of the cell as a whole, still it will affect said conductivity and will act to increase the effectiveness of the cell. After the selenium cake and layer of platinum have been removed from the glass plate, the selenium, or other material, may be mounted on an insulating base 17, as shown in Fig. 5, or in any other suitable manner, and electrical conductors 18 and 19 may be attached to the separate halves of the metal film to carry the current to and from the same.

It is known that selenium has a strong chemical affinity for certain metals, tending to reduce them to selenides, which have a comparatively low electrical conductivity. This being the case, a variable resistance unit, which makes use of such metals for the electrical poles, deteriorates, owing to the formation of the film of selenide between the metal itself and the selenium. Consequently, in the construction of these variable resistance units, it is desirable to use metals which are not affected in this way by the selenium. Platinum and certain other noble metals are not affected perceptibly in the above manner, so that they are particularly desirable for use in making such variable resistance units. It will be evident from a consideration of the electrical poles of this variable resistance unit, that the major portion of the conductivity is afforded by the variable resistance material which lies in the interstices between the electrical conductors because of the extreme narrowness of these interstices. In other words, practically all of the current will flow across these interstices directly and the portion of current which is shunted through the block of variable resistance material underneath will be an extremely small percentage. The narrower the interstices, the greater the percentage of current which will flow across them between the conductors. Inasmuch as practically all of the material lying in these interstices will have its conductivity affected by the intensity of the light, it is seen that the variation of the resistance of the unit, as a whole, will be affected by the action of the light to the greatest possible extent, because practically the entire variable resistance conductor will be affected by the light.

It is a fundamental law of electricity that the current is inversely proportioned to the resistance of the path through which it flows. In the present case the path of the current through the selenium is a compound path, one element being the portion of selenium which fills the interstices between the electrical conductors, and the other element being the cake of selenium behind the conductors and the interstices. Now the portion of electricity flowing through each of these elemental paths is inversely proportioned to the resistance of that path. By making the distance between the metallic conductors extremely small, the conductivity of these parts becomes relatively high. Any current which flows down through the cake of selenium behind the interstices must travel a much greater distance, and consequently the conductivity of this path is relatively low. Therefore, the greater portion of the electricity will pass directly across the interstices, and will, therefore, pass through the portion of selenium whose resistance is affected by the intensity of the light. For this reason, by far the greater portion of the electricity will be passing through selenium whose resistance is variable by the action of light, and, therefore, the sensitiveness of the cell will be high.

We claim:

1. A resistance unit variable by the action of light, consisting of metallic conductors separated by minute interstices, and a material in said interstices, whose conductivity is affected by the intensity of light, the width of said interstices being so related to the thickness of the conductors that the material in the interstices forms the major portion of the conductance of the resistance unit, whereby the major portion of the electricity flows through material whose resistance is affected by the intensity of light, substantially as described.

2. A resistance unit variable by the action of light, consisting of conductors, separated by minute interstices, and a material in said interstices, whose conductivity is affected by the intensity of light, the thickness of the conductors adjacent the interstices being such that the major portion of current through the variable resistance material lies in that portion of said material whose conductivity is affected by the light whereby the major portion of the electricity flows through material whose resistance is affected by the intensity of light, substantially as described.

3. A resistance unit variable by the action of light, consisting of translucent conductors, separated by minute interstices, and a material in said interstices and behind the conductors, whose resistance is variable by the action of light, substantially as described.

4. A resistance unit variable by the action of light, comprising a pair of flat metallic conductors separated by a minute interstice, and comprising opposite portions of a thin sheet of metal severed by a scratch to produce the interstice, and a material in said interstice, whose resistance is variable by the action of light, substantially as described.

5. A resistance unit variable by the action of light, consisting of flat electrical conductors, separated by minute interstices, and a material in said interstices whose conductivity is affected by the intensity of light, the portion of such material which lies between or connects the conductors being directly exposed to the light which affects it, and the distance through said material measured between the conductors being substantially greater than the thickness of the conductors, whereby the thickness of the material lying in the interstices between the conductors is such that light penetrates the entire thickness of said material to vary the resistance of the same, substantially as described.

6. A resistance unit variable by the action of light, consisting of thin conductors, separated by minute interstices, and a material in said interstices whose conductivity is affected by the intensity of light, the thickness of the conductors and of the material between them being such that the conductivity of substantially the entire thickness of said material is affected by the intensity of light striking its surface, substantially as described.

OSCAR LINDER.
JAMES B. REPLOGLE.

Witnesses:
THOMAS A. BANNING, Jr.,
FRANCES M. FROST.